May 5, 1925.
E. MARTIN
1,536,444
PICKER TEETH FOR LOADERS
Filed June 9, 1922
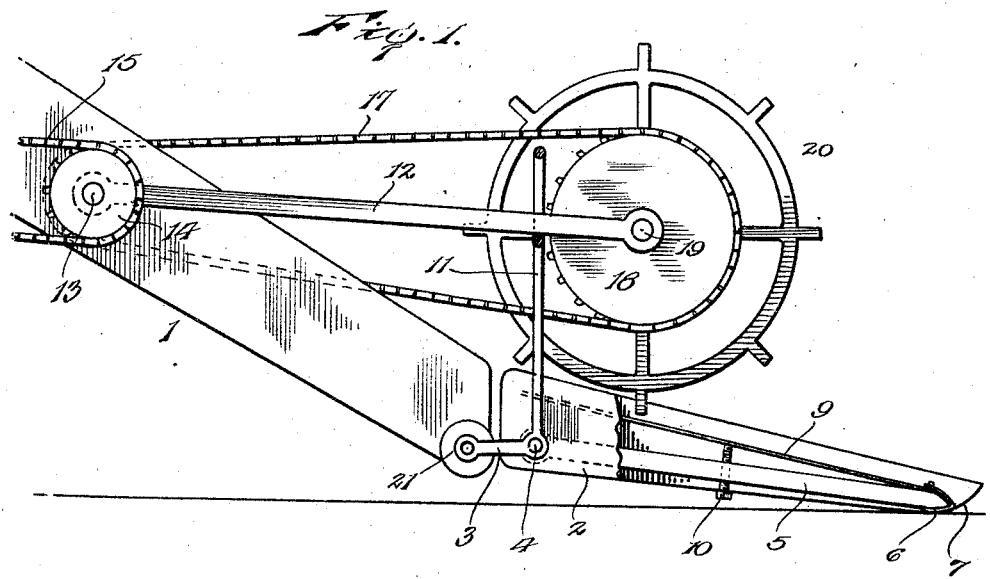
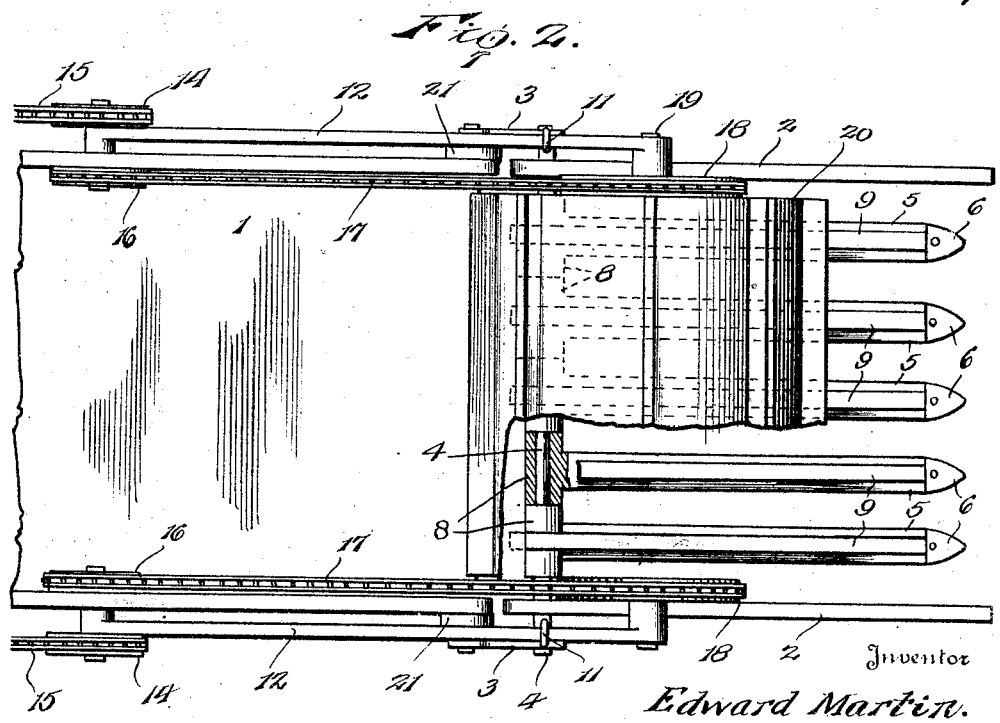
Inventor
Edward Martin.
By Lacey & Lacey, Attorneys Patented May 5, 1925.

1,536,444

UNITED STATES PATENT OFFICE.

EDWARD MARTIN, OF COLWICH, KANSAS.

PICKER-TEETH FOR LOADERS.

Application filed June 9, 1922. Serial No. 567,100.

*To all whom it may concern:*

Be it known that I, EDWARD MARTIN, a citizen of the United States, residing at Colwich, in the county of Sedgwick and State of Kansas, have invented certain new and useful Improvements in Picker-Teeth for Loaders, of which the following is a specification.

This invention relates to loaders of the type disclosed in Letters Patent, No. 1,258,351, granted to me March 5, 1918, whereby bundles of hay, wheat, or other grain are gathered and delivered to conveyers or other mechanism. The invention has special reference to the picker teeth which run in advance of the main machine and take up the bundles, the object of the invention being to provide simple means whereby the teeth may conform to the irregularities of the surface of the ground and each tooth adjust itself independently of the other teeth to such irregularities. The invention also seeks to provide simple and efficient means whereby the bundles lifted from the ground by the picker teeth will be positively delivered to the conveyer or other mechanism.

One embodiment of the invention is illustrated in the accompanying drawings, in which—

Figure 1 is a side elevation, partly broken away, of my improved mechanism;

Fig. 2 is a plan view of the same.

In the drawings, the reference numeral 1 indicates a portion of a loader or other machine and 2 designates side plates or runners which are connected with the machine in any convenient or preferred manner as by brackets 3 having a rod 4 extended through their front ends upon which the side plates are pivoted. Between the side plates, I pivotally mount upon the said rod 4 a plurality of picker fingers 5 which extend downwardly and forwardly from the said pivot-rod and have their front ends tapered and shod with metal, as shown at 6, whereby they may readily ride over the surface of the ground and pass under the bundles of grain or other material to be gathered. It will, of course, be understood that in order to facilitate the progress of the side plates over the field, their front ends are tapered or made convex, as indicated at 7, so that neither the side plates nor the teeth are apt to dig into the ground and arrest the progress of the apparatus or damage any of the parts. The teeth 5 are constructed at their rear ends with lateral sleeves or hub members 8 which fit loosely about the pivot rod 4 so as to permit the teeth to rock upon said rod and the ends of adjacent hubs abut, as shown clearly in Fig. 2, so that the teeth will be maintained in their proper spaced relation and undue lateral movement thereof will be prevented. Upon each tooth at the front end thereof, I secure the end of a spring plate 9 which extends upwardly and rearwardly from the shoe 6 and terminates adjacent the hub of the tooth, the rear end of the said plate being free of the tooth and the hub, as clearly shown. These several springs 9 serve as yieldable supports for the bundles so that the teeth will be relieved of shock which may be caused by the weight of the bundle being suddenly placed upon the teeth, and the several springs may be readily adjusted by manipulation of set screws or bolts 10 which are mounted in the teeth below the springs and have their upper ends in contact with the under sides of the springs, as clearly shown in Fig. 1.

Rising from each side plate or runner 2 adjacent the rear end thereof is a guide 11 which may be of any practical or preferred form and is illustrated in the form of a short standard having its upper portion slotted, as clearly shown in Fig. 1. Through each of these guides extends an arm 12 which is pivoted at its rear end upon a stud or shaft 13 carried by the loader or conveyer 1 and equipped with a sprocket 14 whereby motion may be imparted to the shaft 13 through a chain 15 extending to the motor or main driving shaft of the conveyer or other machine. Between the sides of the machine 1, sprockets 16 are secured upon the shafts 13 and chains 17 are trained around the said sprockets and around sprockets 18 which are fixed to a shaft 19 rotatably mounted in the front ends of the arms 12, said shaft 19 carrying a reel 20 which is adapted to act upon the bundles which may be deposited upon the several springs 9 and positively feed the said bundles into the loader or other machine, indicated at 1. The reel 20 may be of any preferred form and obviously is permitted to readily accommodate itself to the thickness or diameter of the shocks or bundles which may be lying upon the several springs 9 inasmuch as the arms 12 are pivotally mounted upon the shaft 13 and may swing easily and readily about said shaft as a center. At the same time, the guides 11 limit the downward movement of the arms and also serve to maintain them in vertical planes during their upward or downward movement. At the rear ends of the brackets 3, rollers 21 may be provided so that the front ends of the loader will not dig into the ground in the event of contact therewith. For convenience, the guides 11 may rise from the front ends of the brackets 3, and are so illustrated.

It will be readily noted that I have provided an exceedingly simple and inexpensive mechanism, and its operation is thought to be evident from what has been said. The machine is caused to travel over the field upon which the shocks may be standing and the several picker teeth are driven under the shock or bundle so that it will topple over onto the teeth and rest upon the springs 9 which serve to eliminate any breaking shock or strain which might be otherwise imposed upon the several picker teeth. The reel is constantly rotating and will at once engage the upper side of the shock or bundle and impart rearward travel thereto so that it will pass directly onto the conveyer or other mechanism.

Having thus described the invention, what is claimed as new is:

1. The combination of a supporting device, a plurality of picker teeth independently pivoted upon the supporting device, spring plates secured at their front ends upon the several teeth and extending longitudinally of the teeth and having their rear ends free, and means mounted in the several teeth and engaging the under sides of the respective plates to adjust the tension of the same.

2. The combination of a supporting device, a plurality of picker teeth independently pivoted upon said device, arms pivoted upon the supporting device above and in rear of the teeth and projecting forwardly over the teeth, vertical guides for said arms, a reel carried by the said arms above the picker teeth, and means for actuating said reel.

3. The combination of a supporting device, a plurality of picker teeth independently pivoted upon the supporting device, spring plates secured at their front ends upon the respective teeth and extending longitudinally rearward over the teeth and having their rear ends free, and set screws fitted vertically through the several teeth and having their upper ends bearing against the under sides of the respective spring plates.

4. The combination of a supporting device, a plurality of picker teeth independently pivoted upon the said device, spring plates secured at their front ends upon the front ends of the respective teeth and extending longitudinally rearward over the teeth and having their rear ends free, a reel pivotally supported above and cooperating with the teeth and the spring plates, and means for preventing lateral movement of the reel.

In testimony whereof I affix my signature.

EDWARD MARTIN. [L. S.]